April 28, 1936.  L. M. MASSON  2,038,799
CHANGE SPEED GEAR
Filed April 18, 1935
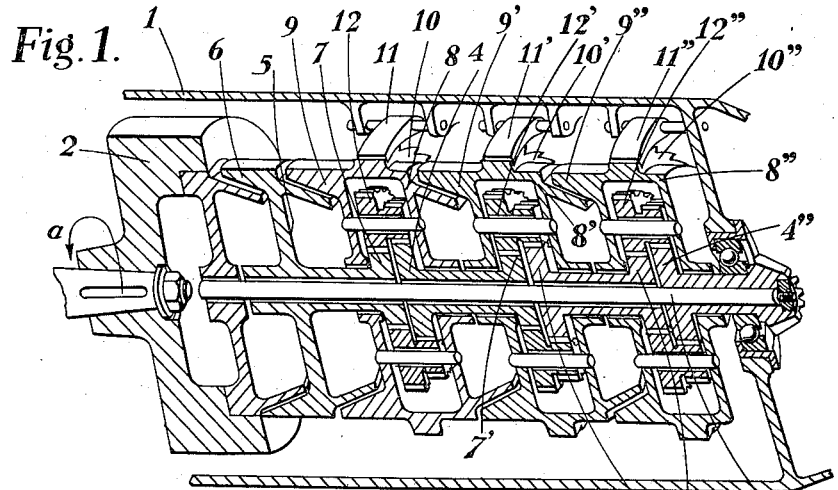
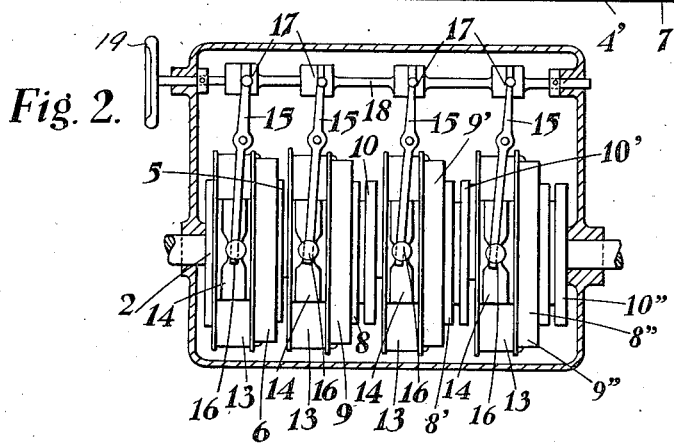
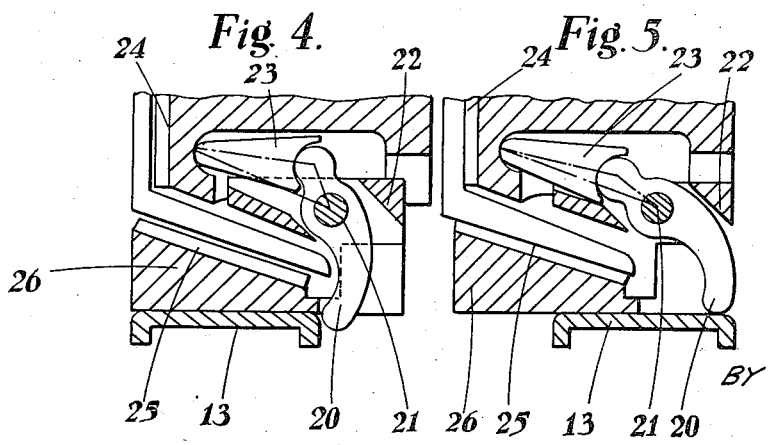
INVENTOR
Louis Maxime Masson
BY
W. H. Blake
ATTORNEY Patented Apr. 28, 1936

2,038,799

UNITED STATES PATENT OFFICE 2,038,799

CHANGE SPEED GEAR

Louis Maxime Masson, Paris, France, assignor to Omnium Financier pour l'Industrie et le Commerce (Societe Anonyme), Paris, France, a corporation of France Application April 18, 1935, Serial No. 17,085
In France April 21, 1934

2 Claims. (Cl. 74—279)

The present invention relates to a change speed gear box in which are located in succession and in alignment:

(a) A plate with a clutch enabling the driving pinion of a reduction gear to be coupled to the driving shaft;

(b) One or more reduction gears capable of being coupled: the first to the plate indicated in paragraph a and each of the succeeding ones to the one which precedes it; each of the said reduction gears is provided with a free wheel mechanism which prevents it from turning in a direction opposite to that of the driving shaft when it is coupled with the latter.

There is thus formed a change speed gear wherein:

1. The pinions are always in engagement;
2. The pinions of each reduction gear are set in rotation or stopped by clutching or de-clutching the gear itself without the driving couple ceasing to be transmitted at any moment.
3. Direct drive is obtained by clutching the last gear to the preceding ones which have already been coupled together, in which position no pinion turns relatively to that with which it gears, the teeth only effecting the transmission of the driving couple.

In the accompanying drawing:

Fig. 1 shows in perspective and in section the general arrangement of a four-speed gear according to the invention.

Fig. 2 shows a form of construction of the clutches and their actuating device.

Fig. 3 is a diagrammatic development of the actuating drums of the clutches.

Fig. 4 is a section of a detail of construction of a clutch in the declutched position.

Fig. 5 shows the same in the clutched position.

In Fig. 1, 1 is a fixed casing, 2 is the flywheel of the driving shaft rotating in the direction of the arrow a, 3 is the driven shaft rotating freely on the flywheel 2 by which it is supported and in the reduction gears supported thereby. This shaft is secured to the driven pinion 4" of the last gear, 5 is the plate carrying the first clutch 6 and the pinion 7 which drives the first reduction train. 8, 8', 8" are reduction units (similar to one another in the example shown) each provided with a clutch 9, 9', 9", which can be engaged with the preceding element, and with a free wheel device shown in the most elementary manner by ratchet wheels 10, 10', 10", and pawls 11, 11', 11". The reduction gears each comprise a driving wheel 7, 7', 7" gearing with a driven wheel 4, 4', 4" by one or more trains 12, 12', 12" supported by the units 8, 8', 8", the pinion 4 being secured to the pinion 7' and the pinion 4' being secured to the pinion 7".

The operation is as follows:—

In the neutral position the four clutches are declutched. For passing to the first speed the first clutch 6 is engaged; the pinion 7 secured to 6 drives 12 then 4 which in turn drives 7', 12', and 4' which in turn finally drives 7", 12", and 4".

Assuming that in each reduction gear the ratio of gears produces a reduction in speed of ratio 2:5 there will be obtained, in the case of the first speed above described a total reduction ratio of 1·5×1·5×1·5=3·375.

For passing to the second speed the clutch 9 is engaged whilst leaving the clutch 6 also engaged; the unit 8 is connected to the plate 5 and to the driving shaft; the pinions 7, 12, 4 are locked together and only serve as driving elements for the pinion 7' which then drives the two reduction trains 7', 12', 4' and 7", 12", 4" producing a reduction ratio of 1·5×1·5=2·25 only.

For passing to 3rd speed the clutch 9' is engaged without declutching 6 and 9, the unit 8' is thus in turn coupled to the driving shaft as a result of which the speed reducing pinions which it contains are rendered inoperative as above described. The reduction in speed in this case is thus not more than 1·5.

For passing to the fourth speed 9" is clutched, without declutching the other clutches whereby the unit 8" is coupled to the preceding ones and the last reduction stage is eliminated, thus producing direct drive.

For passing downwardly through the various speed stages the operation is exactly the reverse to that above described, each reduction gear when declutched coming to rest relatively to the fixed casing its free wheel mechanism ensuring therefor a point of support so that its reversing couple does not drive in a direction opposite to the arrow a.

In Fig. 2 is shown a form of construction of the clutches and their actuating means, wherein the clutches only set up friction during their operation. In this figure each of the clutches 6, 9, 9', 9" is provided with a ring 13 sliding freely on the body of the clutch and of which the movement (from left to right in the figures) is produced by lateral shoes 14 which are operated by levers 15 through the medium of ball joints 16. The levers 15 are operated by drums 17 mounted on a shaft 18, operable from the outside by a hand wheel 19.

The drums 17 are provided with grooves, of which a development is shown diagrammatically in Fig. 3, for effecting the successive clutching of the clutches as above described.

In Figs. 4 and 5 is shown the action of the rings 13 on the levers 20, hinged at 21 to the driven member 22 and acting on dogs 23 which apply the linings 24 and 25 against the driving member 26. It will be seen that in the clutched position (Fig. 5) the levers 20, located in the interior of the ring 13, do not produce any longitudinal force and thus no appreciable friction between the ring 13 and its driving shoes 14.

It will be understood that the form of construction above described is only given by way of example as the actuation of the clutches may be effected equally well by other known means (transmission by compressed air or fluid, electrically and so forth) as long as these means are actuated in a manner for obtaining successive clutchings as in the case of the mechanical actuation above described.

In all cases there is obtained a very smooth transition between the speeds without the couple ceasing to be transmitted at any moment, in contrast to what occurs in change speed gears with pinions and a single clutch of usual type.

There is thus obtained a control of the speeds as flexible as that obtained, for example, by a controller on an electric vehicle.

It will thus be seen that the means of construction above described may be varied to a large extent without departing from the scope of the following claims.

I claim:

1. In a change speed gear the combination with a driving shaft and a driven shaft of a plate and a reduction unit arranged in alignment, a clutch on said plate, a clutch on said unit, said clutches being adapted to co-operate with one another, said reduction unit including a train of gear wheels, one of said gear wheels being carried by said plate and another of said gear wheels being keyed to said driven shaft, a clutch on said driving shaft, means for successively bringing said clutches into and out of operative engagement with one another, and means for preventing said unit from rotating in a direction opposite to the direction of rotation of said driving shaft, said means being independent of the means for operating said clutches.

2. In a change speed gear the combination with a driving shaft and a driven shaft, of a plate and a plurality of reduction units arranged in alignment, a clutch on said plate, a plurality of clutches provided one on each of said units, said clutches being adapted to be brought successively into engagement with one another, each of said reduction units including a train of gear wheels, one of the gear wheels of the first reduction unit being carried by said plate and another of said gear wheels being connected to the first gear wheel of the next unit, one of the gear wheels of the last unit being keyed to said driven shaft, a clutch on said driving shaft, means for successively bringing said clutches into an operative engagement with one another, and means for preventing said units from rotating in a direction opposite to the direction of rotation of said driving shaft, said means being independent of the means for operating said clutches.

LOUIS MAXIME MASSON.